US012466635B2

(12) United States Patent
Zamenski et al.

(10) Patent No.: US 12,466,635 B2
(45) Date of Patent: Nov. 11, 2025

(54) HYDRATION SYSTEM ADAPTED FOR USE IN CBRN ENVIRONMENTS

(71) Applicant: D. Wheatley Enterprises, Inc., Belcamp, MD (US)

(72) Inventors: Corey Zamenski, Belcamp, MD (US); Patrick Hulbert, Dallastown, PA (US); Jonathan Warner, Belcamp, MD (US)

(73) Assignee: D. Wheatley Enterprises, Inc., Belcamp, MD (US)

(*) Notice: Subject to any disclaimer, the term of this patent is extended or adjusted under 35 U.S.C. 154(b) by 301 days.

(21) Appl. No.: 18/193,257

(22) Filed: Mar. 30, 2023

(65) Prior Publication Data

US 2023/0312223 A1 Oct. 5, 2023

Related U.S. Application Data

(60) Provisional application No. 63/325,449, filed on Mar. 30, 2022.

(51) Int. Cl.

| | |
|---|---|
| ***B65D 83/38*** | (2025.01) |
| ***A62B 18/08*** | (2006.01) |
| ***B65D 83/384*** | (2025.01) |
| ***B65D 83/40*** | (2006.01) |
| ***B65D 83/42*** | (2006.01) |

(Continued)

(52) U.S. Cl.

CPC .......... *B65D 83/384* (2013.01); *A62B 18/086* (2013.01); *B65D 83/40* (2013.01); *B65D 83/425* (2013.01); *B65D 83/48* (2013.01); *B65D 83/70* (2013.01)

(58) Field of Classification Search

CPC .... B65D 83/384; B65D 83/40; B65D 83/425; B65D 83/48; B65D 83/70; A62B 18/086; B05B 9/035; B05B 9/0833; B05B 15/33

See application file for complete search history.

(56) References Cited

U.S. PATENT DOCUMENTS 8,070,023 B2 * 12/2011 Vitantonio ........... B67D 1/0418 222/400.7
10,974,947 B1 * 4/2021 Qiao .................... B67D 1/0406

(Continued)

*Primary Examiner* — Bob Zadeh

(74) *Attorney, Agent, or Firm* — Whiteford, Taylor & Preston, LLP; Gregory M. Stone

(57) ABSTRACT

A hydration system maintains a ready supply of hydrating fluid within a sealed system that protects against contamination of the fluid supply and of the user in a CBRN environment. The system includes a fluid container having a removable cap that is equipped with a pressurization system that pressurizes the inside of the fluid container. Pressure inside of the fluid container drives the hydrating fluid, such as water, to an outlet in the cap and onward to a shuttle valve. In an exemplary embodiment, the shuttle valve has an inlet configured for fluid connection to the pressurized container, an outlet configured for connection to a supply line to the user's protective mask, and an intermediate port for connection to a personal hydration carrier carried by the user. The shuttle valve allows for filing of the user's individual water carrier and drinking of that fluid from the water carrier without exposing the hydrating fluid to the CBRN environment, and without requiring the user to disconnect their mask from the system.

20 Claims, 12 Drawing Sheets

(51) Int. Cl.

| | |
|---|---|
| ***B65D 83/48*** | (2006.01) |
| ***B65D 83/70*** | (2006.01) |

(56) References Cited

U.S. PATENT DOCUMENTS

| | | | | |
|---|---|---|---|---|
| 2006/0011664 | A1* | 1/2006 | Hammond | B67D 1/0412 222/400.7 |
| 2012/0031932 | A1* | 2/2012 | Vitantonio | B67D 1/1281 222/399 |
| 2021/0380332 | A1* | 12/2021 | Rege | B65D 83/66 |
| 2023/0312223 | A1* | 10/2023 | Zamenski | B65D 83/425 222/192 |

* cited by examiner

HYDRATION SYSTEM ADAPTED FOR USE IN CBRN ENVIRONMENTS

CROSS-REFERENCE TO RELATED APPLICATIONS

This application claims the benefit of U.S. Provisional Patent Application No. 63/325,449 titled "CBRN HYDRATION SYSTEM," filed by the Applicant herein on Mar. 30, 2022, the specification of which is incorporated herein by reference in its entirety.

FIELD OF THE INVENTION

This invention relates generally to hydration systems configured to supply hydration to an operator wearing a protective mask, and more particularly to a hydration system configured to maintain a ready supply of a hydrating fluid, such as water, within a sealed system that protects against contamination when used in a contaminated environment (such as a CBRN environment), thus enabling an operator to refill and drink from a personal hydration carrier without exposing the water to the hazardous environment and without requiring that the operator disconnect the system from their protective mask.

BACKGROUND OF THE INVENTION

Hydration is essential for human survival and is particularly important for individuals working in strenuous or hazardous environments. A variety of hydration systems have previously been provided that are intended to provide an individual with a ready supply of a hydrating fluid, such as water. Such hydration systems may be particularly helpful in those environments in which access to potable water is limited, or where individuals are involved in strenuous activities.

One such scenario in which hydration systems, and more particularly portable, person-worn hydration systems, may be useful is in environments in which persons such as first responders, other emergency personnel, or military operators don personal protective equipment, including for example protective masks. Wearing a protective mask can be physically taxing, leading to increased fluid loss through sweating, and thus increased need for on-demand hydration to avoid heat exhaustion, dehydration, and other related complications.

Moreover, in particularly hazardous environments, such as those in which the individual is operating in an environment potentially exposing them to chemical, biological, radiological, and/or nuclear ("CBRN") agents, traditional hydration systems are ineffective and can pose significant health risks to such operators. It is essential that in such cases, the water or other hydrating fluid supply be protected from the CBRN environment, as exposure to contaminated water can lead to severe health problems, including respiratory distress, skin irritation, and even death. Unfortunately, traditional hydration systems, such as canteens or CAMELBAK® type water carriers, are often insufficient for use alone in such environments, as they can be difficult to fill without exposing the hydrating fluid to the surrounding contaminated environment.

While efforts have been made to provide hydration systems for use with protective masks, such previously known systems have suffered from various limitations, such as the complexity of the system designs and the steps required by an operator to properly and safely use them, difficulties in refilling the systems, and vulnerability to contamination of the hydrating fluid.

Thus, there remains a need in the art for a hydrating system that easily enables an operator wearing a protective mask to drink from and refill their personal hydration carrier while minimizing the risk of exposure of the operator or the hydrating fluid to a contaminated environment. Such a hydrating system should maintain a ready supply of a hydrating fluid within a sealed system that protects against contamination when used in a contaminated environment, such as a CBRN-contaminated environment. Moreover, such a hydrating system should be easy to fill and use, and should enable filling of the operator's personal hydration carrier without exposing the hydrating fluid to the environment, and without requiring the operator to remove their protective mask.

SUMMARY OF THE INVENTION

In accordance with certain aspects of the invention, a hydration system is provided that avoids one or more of the foregoing disadvantages of previously known hydration systems. In a particularly preferred embodiment, a hydration system is provided that maintains a ready supply of hydrating fluid, such as by way of non-limiting example water, within a sealed system that protects against contamination in a hazardous environment, such as a CBRN environment. The system includes a fluid container with a removable but sealable cap that allows for easy filling of the container with, for example, potable water in a safe environment. The underside of the cap carries a pressurization system that pressurizes the interior of the fluid container to drive hydrating fluid through a conduit to an outlet in the cap. A manual switch on the outside of the cap opens a valve to direct pressurized air from one or more pressurized air cylinders attached to the pressurization system inside of the fluid container, through a regulator of the pressurization system, and out of the regulator into the interior of the fluid container. Hydrating fluid under pressure is then directed through the conduit to the outlet in the cap, and from the outlet in the cap through a fluid supply line that attaches to a shuttle valve. In a particularly preferred configuration, the shuttle valve includes an inlet at one end of the valve that receives hydrating fluid from the fluid supply line, an outlet at the opposite end of the valve that directs hydrating fluid through a mask supply line to a protective mask worn by the operator, and an intermediate port that is in fluid communication with a water carrier that is carried by the operator, such as a CAMELBAK® water container.

Further in accordance with a particularly preferred configuration, when a connector from the fluid supply line is attached to the inlet of the shuttle valve, an internal piston moves to close the outlet of the shuttle valve and to allow hydrating fluid from the fluid container that enters the inlet to exit through the intermediate port to fill the operator's water carrier. When the connector from the fluid supply line is removed from the inlet of the shuttle valve, the internal piston moves to close the intermediate port and opens the outlet to allow hydrating fluid to flow from the operator's water carrier through the intermediate port of the valve, and out of the outlet through a mask supply line to the operator's protective mask.

In accordance with certain aspects of an embodiment of the invention, a hydration system is provided comprising a pressurization system attached to a cap configured for removable attachment to a fluid container. The cap has a top side and a bottom side, wherein the bottom side of the cap is configured for sealing engagement against an inlet/outlet opening of the fluid container. The pressurization system further comprises a pressure manifold having at least one manifold inlet on a bottom side of the pressure manifold, an air cartridge removably attached to the at least one manifold inlet, a pressure regulator affixed to the manifold and attached to the bottom side of the cap, the pressure regulator having an outlet, a valve on the bottom side of the cap, the valve having a valve inlet in fluid communication with the outlet on the pressure regulator, a valve outlet opening to a space below the bottom side of the cap, a fluid outlet extending through the cap, a hose attached to the fluid outlet at the bottom side of the cap, and a shuttle valve in fluid communication with the at least one fluid supply connector.

In accordance with further aspects of an embodiment of the invention, a hydration system is provided comprising a fluid supply container having a cap and a pressurization system on an underside of the cap, the pressurization system having a removable source of compressed air and a valve in fluid communication with the source of compressed air, wherein the valve is configured to selectively direct the compressed air to an interior of the fluid supply container to pressurize fluid in the container, and a fluid outlet extending through the cap and configured to direct pressurized hydrating fluid in the fluid supply container through the fluid outlet to a fluid supply line. The hydration system further comprises a shuttle valve configured for fluid communication with the fluid supply line, the shuttle valve having a first end and a second end opposite the first end, the shuttle valve further comprising a fluid supply line receiver at the first end of the shuttle valve body configured to engage the fluid supply line, a first fluid port at the second end of the shuttle valve body, an intermediate port between the first end of the shuttle valve body and the second end of the shuttle valve body, and a piston moveable in the shuttle valve body from a first position sealing the fluid supply line receiver at the first end of the shuttle valve body and enabling fluid communication between the first fluid port at the second end of the shuttle valve body and the intermediate fluid port, to a second position sealing the first fluid port at the second end of the shuttle valve body and enabling fluid communication between the fluid supply line receiver at the first end of the shuttle valve body and the intermediate port.

In each such configuration, a protective mask may be provided in fluid communication with one of the first fluid port at the second end of the shuttle valve body and the intermediate port, and a personal hydration carrier may be provided in fluid communication with the other of the first fluid port at the second end of the shuttle valve body and the intermediate port.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENT

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

Figure 1:
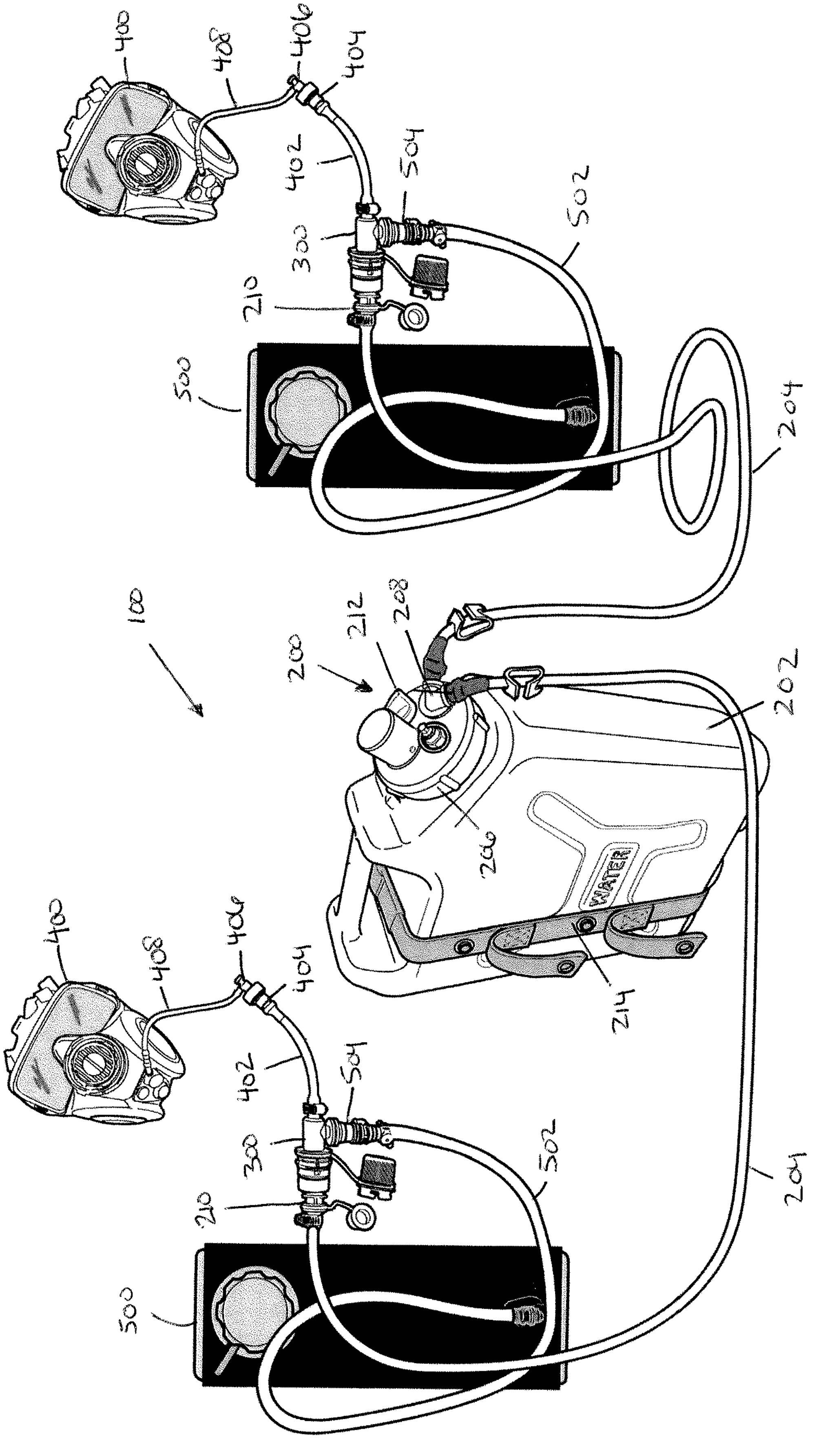
FIG. 1 is a schematic view of a hydration system adapted for use in CBRN environments in accordance with certain aspects of an embodiment of the invention.
Figure 2:
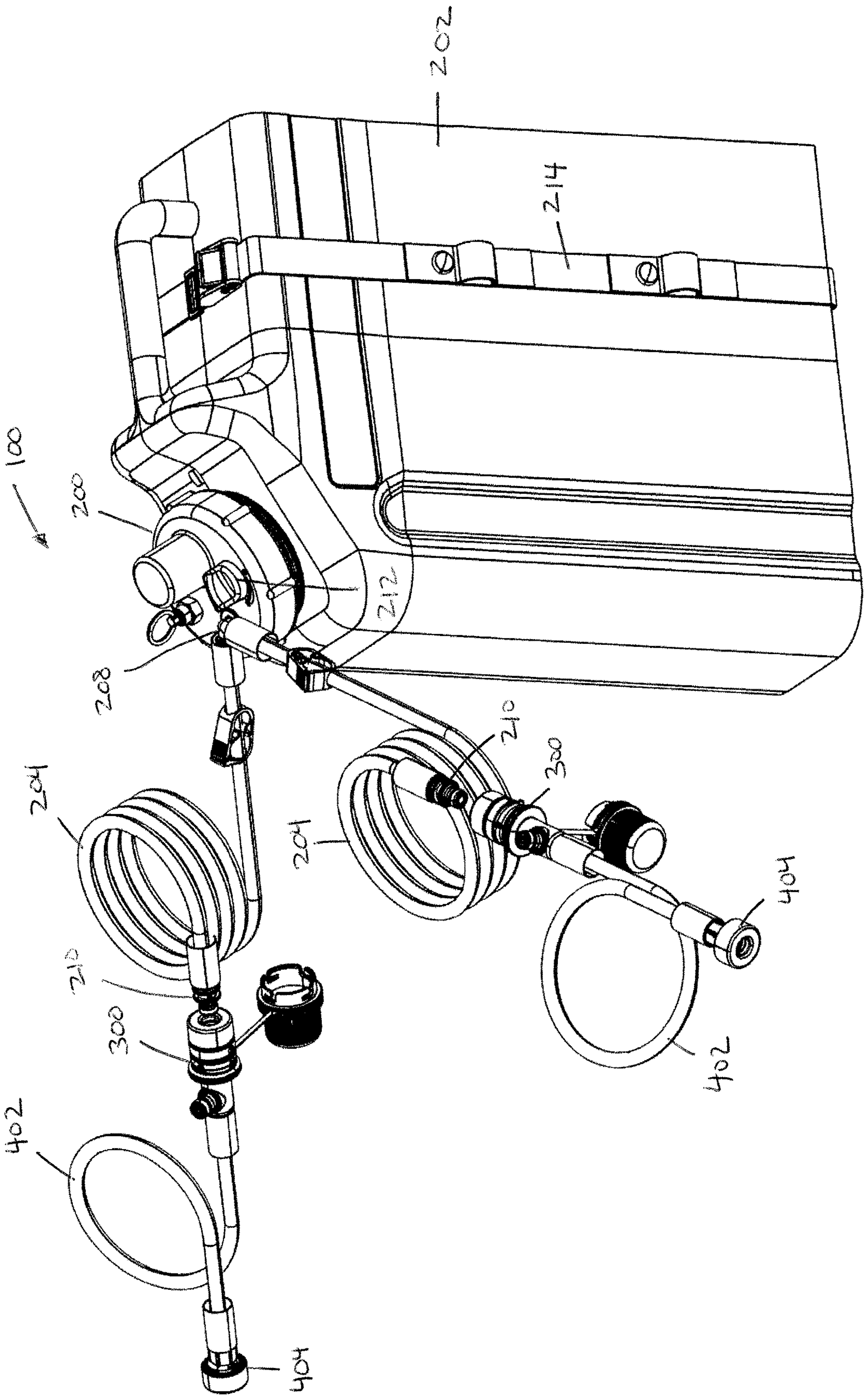
FIG. 2 is a perspective view of a fluid supply container, shuttle valves, and interconnecting fluid conduits for use with the hydration system of FIG. 1.
Figure 3:
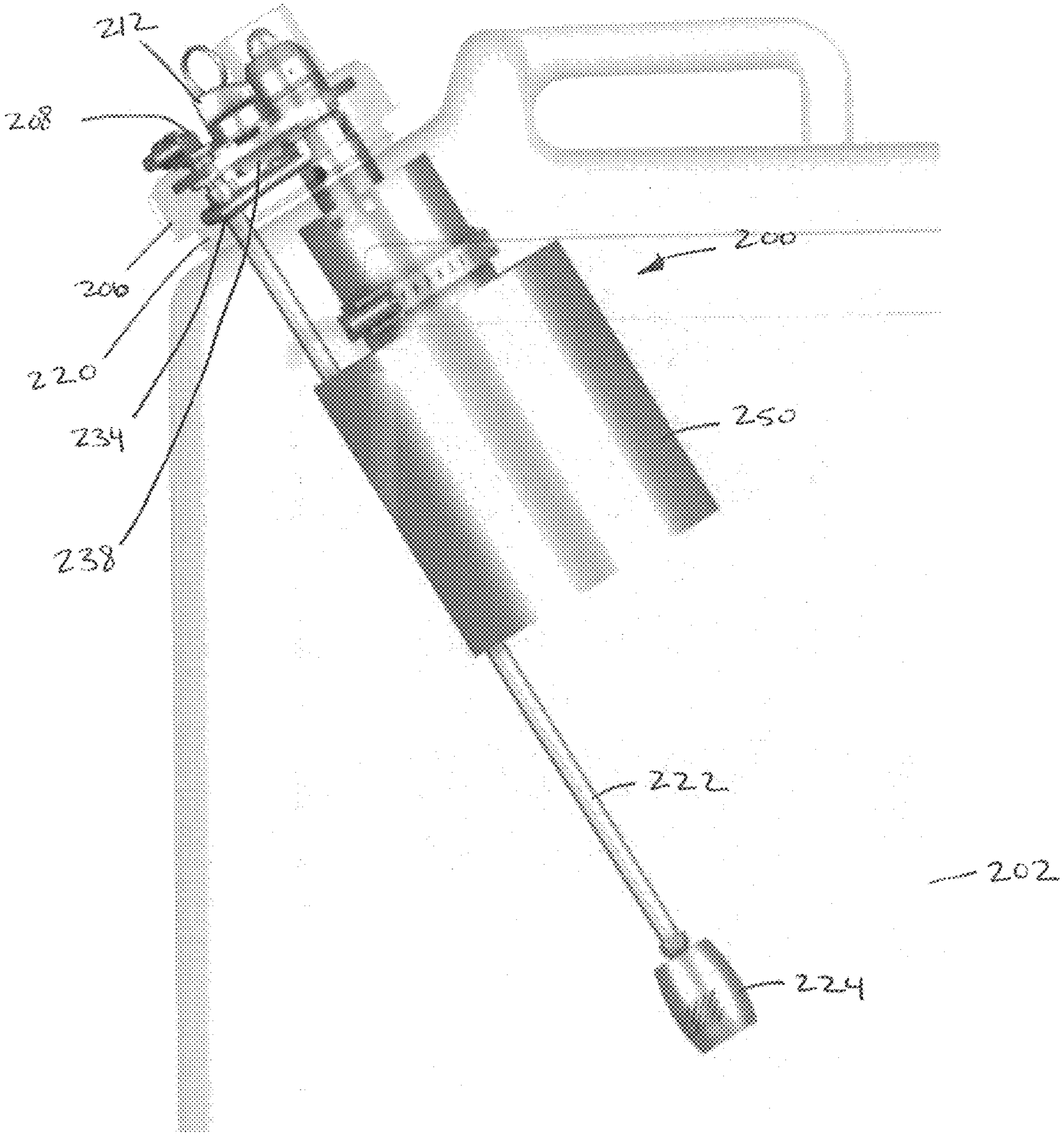
FIG. 3 is a side view of the fluid supply container of FIG. 1.
Figure 4:
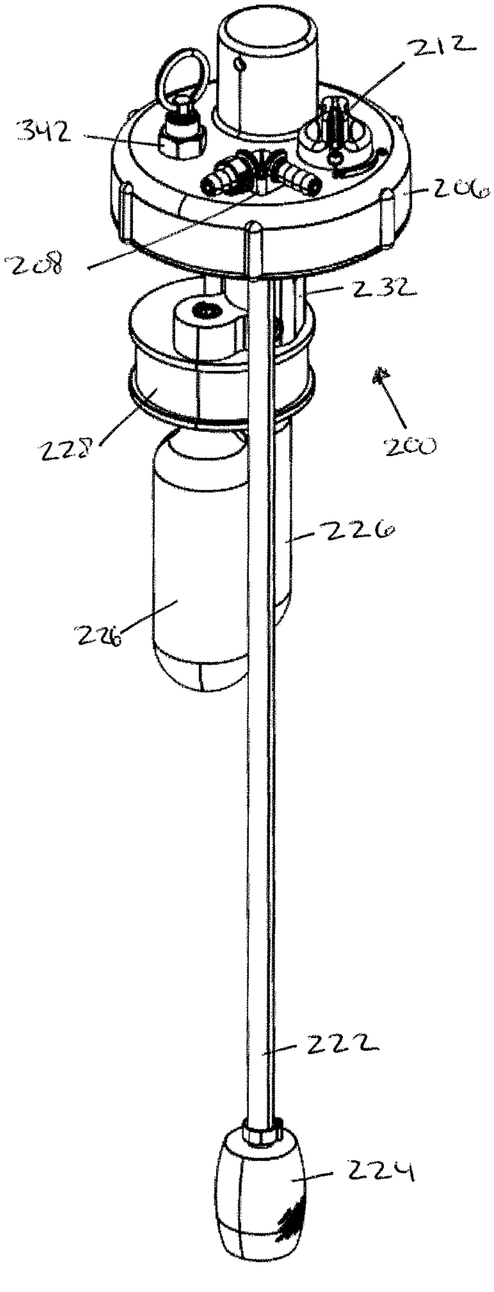
FIG. 4 is a side perspective view of a pressurization system for use in the fluid supply container of FIG. 3.
Figure 5:
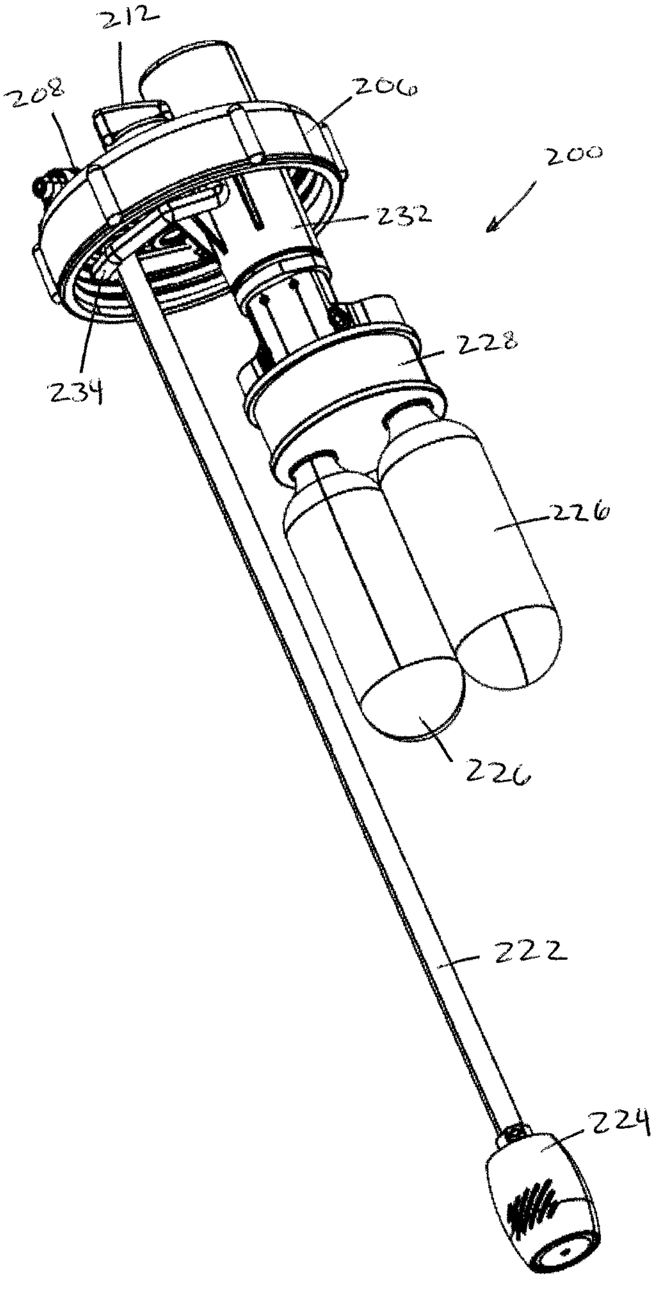
FIG. 5 is another side perspective view of the pressurization system of FIG. 4.
Figure 6:
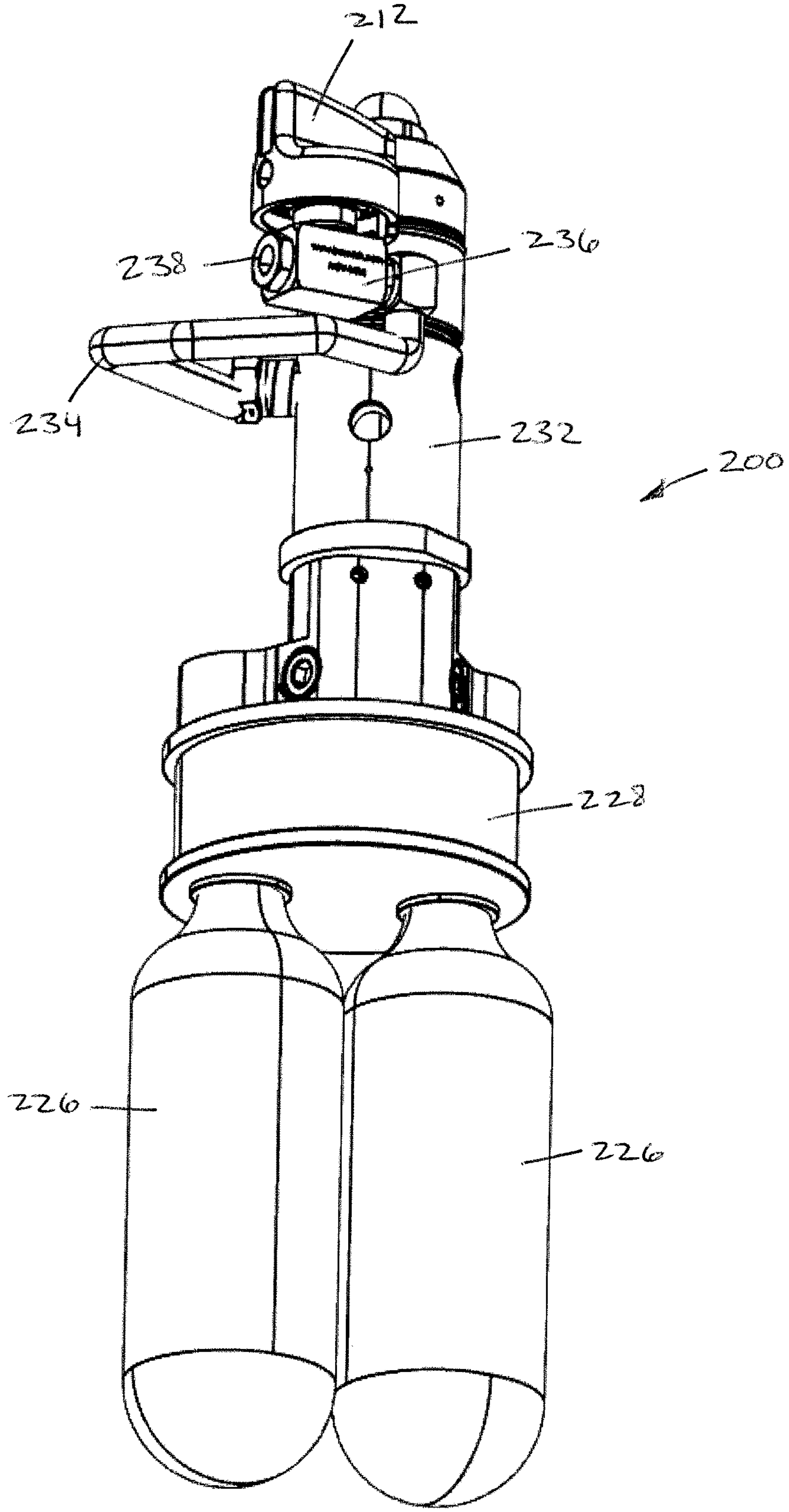
FIG. 6 is another side perspective view of the pressurization system of FIG. 4 with the cap removed for clarity.
Figure 7:
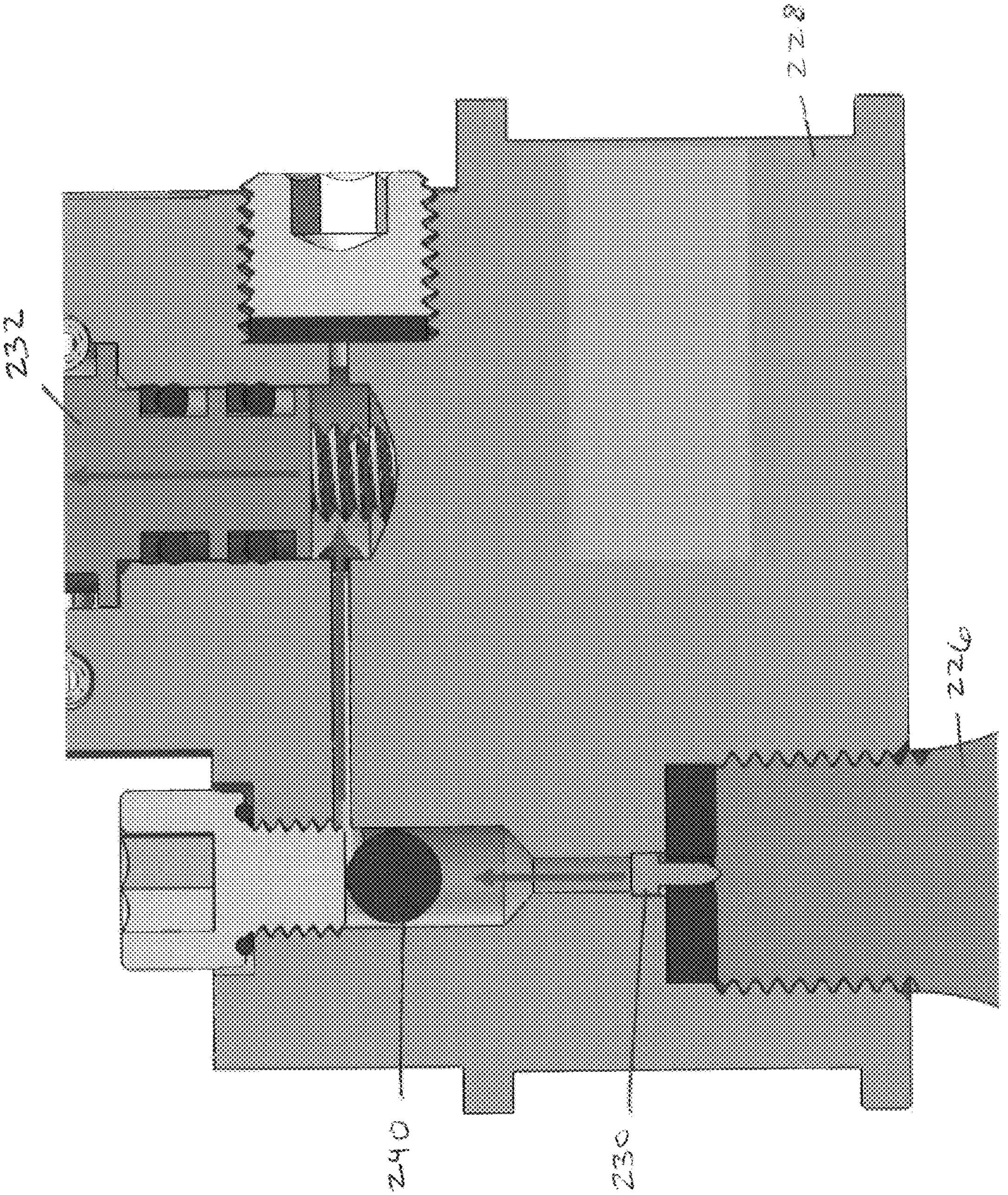
FIG. 7 is a side cross-sectional view of a manifold for use in the pressurization system of FIG. 4.
Figure 9:
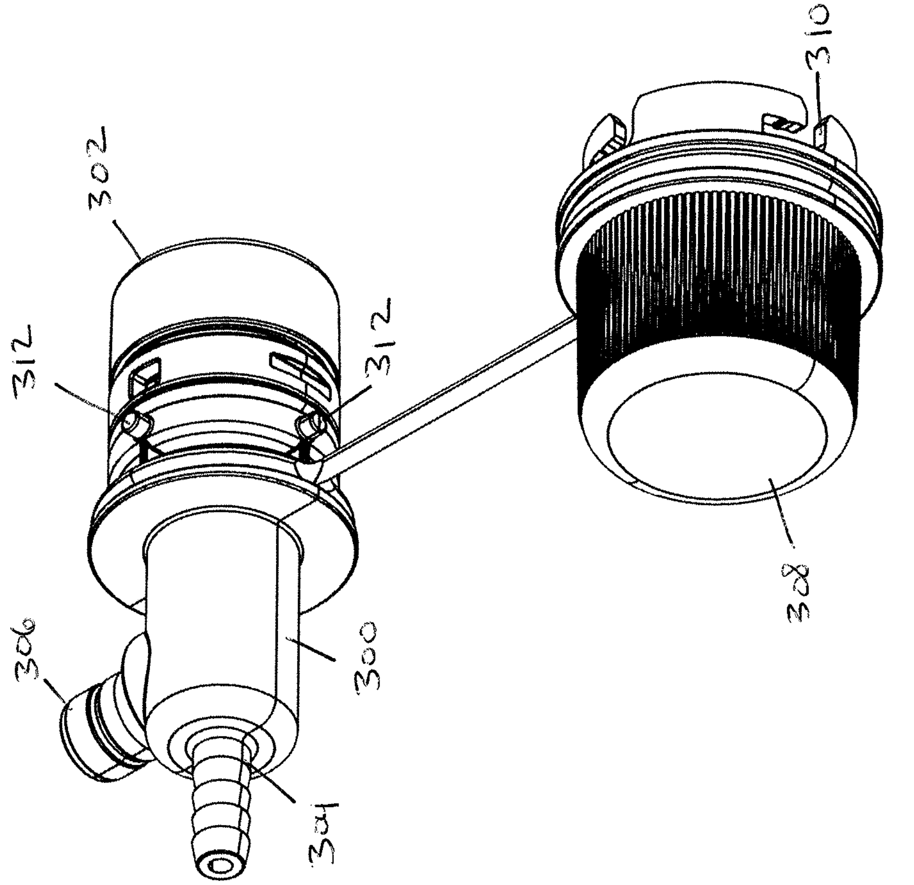
Figure 8:
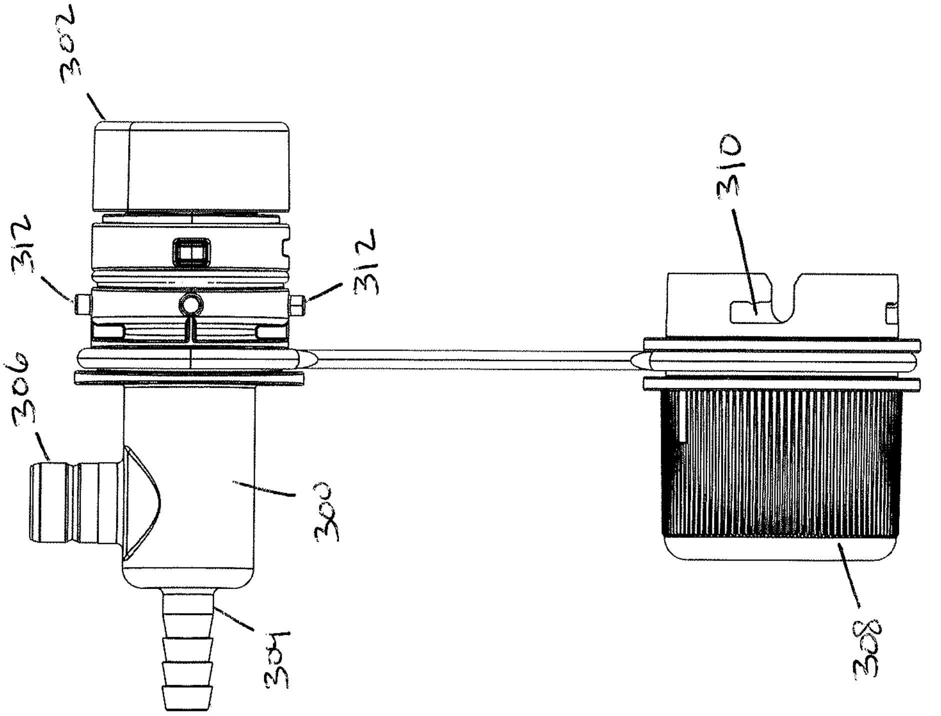
FIG. 8 is a side view and FIG. 9 a perspective view of a shuttle valve for use with the hydration system of FIG. 1.

In accordance with certain aspects of an exemplary embodiment and with particular reference to FIGS. 1 and 2, a hydration system 100 is provided having a fluid pressurization system 200 mounted in a cap that may be attached to a water or other fluid container, such as a Jerry can 202 that when joined with fluid pressurization system 200 forms a sealed, pressurized fluid supply container, and a shuttle valve 300 having an inlet port at a first end of the shuttle valve 300, an outlet port at an opposite end of the shuttle valve 300, and an intermediate port between the inlet and outlet ports. The inlet port of the shuttle valve 300 is configured for connection to a fluid supply line 204 from the pressurization system 200, while the outlet port of the shuttle valve 300 is configured for connection to a mask fluid supply line 402 that directs fluid from shuttle valve 300 to a protective mask 400 worn by an operator. Mask fluid supply line 402 is provided a mask supply line female port 404 configured to connect directly to a standard mask male hydration port 406 of a mask drinking tube 408 of known configuration to those of ordinary skill in the art. Optionally, mask supply line female port 404 has generally the same configuration as a CAMELBAK® type A mask adapter. The intermediate port is configured for connection to a personal hydration carrier fluid line 502 that is in fluid communication with a personal hydration carrier 500, such as a flexible, fillable bladder such as a commercially available CAMELBAK® container. Personal hydration carrier fluid line 502 attaches to the intermediate port of shuttle valve 300 preferably via a CAMELBAK® type A mask adaptor 504. Hydration system 100 is thus configured to maintain a ready supply of water (or other hydrating fluid) within a sealed system that protects against contamination when used in a contaminated environment, such as a CBRN-contaminated environment.

In use, a cap 206 holding pressurization system 200 may be removed in an environmentally safe environment to fill the fluid container 202 with water, after which cap 206 is replaced (e.g., by threading cap onto the threaded opening of fluid supply container 202) to seal fluid container 202. As discussed in greater detail below, the underside of cap 206 carries pressurization system 200 to pressurize the interior of the fluid container 202 to drive water (or other hydrating fluid) through a conduit to an outlet 208 in cap 206. A manual switch 212 on the outside of cap 206 opens an internal valve to direct pressurized air from one or more pressurized air cartridges attached to the pressurization system 200 inside of the fluid container 202, through a regulator of the pressurization system 200, and out of the regulator into the interior of the fluid container 202. Water that is then under pressure is directed through the conduit to outlet 208 in cap 206, and from outlet 208 through fluid supply line 204 to shuttle valve 300. When a connector 210 from fluid supply line 204 is attached to the inlet side of shuttle valve 300, an internal piston moves to close the outlet of shuttle valve 300 to allow water from fluid container 202 to exit through the intermediate port to fill the operator's personal hydration carrier 500. As discussed in greater detail below, connector 210 may comprise a fluid supply line male connector that is configured to attach to a CAM ELBAK® type A mask adapter, and may optionally have generally the same configuration as standard mask male hydration port 406 discussed herein. When the connector 210 from the fluid supply line 204 is removed from the inlet side of shuttle valve 300, the internal piston moves to close the intermediate port of shuttle valve 300 and opens the outlet of shuttle valve 300 to allow water to flow from the operator's personal hydration carrier 500 through the intermediate port of shuttle valve 300, and out of the outlet of shuttle valve 300 through mask supply line 402 to the operator's protective mask 400. The hydration system 100 thus enables filling of the user's individual hydration carrier 500 and drinking of that fluid from the hydration carrier 500 without exposing the hydrating fluid to the CBRN environment, and without requiring the operator to disconnect their mask 400 from system 100 during those operations.

As shown in FIGS. 1 and 2, system 100 is preferably configured to enable connection to more than one shuttle valve 300 at one time, thus enabling multiple operators to refill their personal hydration carriers 500 at the same time. Further, pressurized fluid supply container 202 preferably carries a strap 214 configured to hold and store fluid supply lines 204 when not in use supplying a shuttle valve 300.

Next, FIGS. 3-7 show various aspects of pressurization system 200. As noted above and as best viewed in FIG. 3, pressurization system 200 is suspended from the underside of cap 206 so that it is positioned within the interior of fluid supply container 202, and thus may be installed in fluid supply container 202 when cap 206 is attached to the outlet 220 of fluid supply container 202, such as by way of a threaded connection as is standard on a Jerry can assembly. Pressurization system 200 includes a hose 222 that extends from the bottom of the interior of fluid supply container 202 to outlet 208 in cap 206, and that is configured to carry water or other hydrating fluid from the interior of fluid supply container 202 to outlet 208 in cap 206. Preferably, a fluid strainer and weight 224 is provided at the bottom of hose 222 to maintain the inlet of hose 222 at the bottom of the interior of fluid supply container 202, and to prevent solid particles and foreign matter from inadvertently entering hose 222 (and thus the supply ultimately to the operator's mask 400).

To provide positive pressure to the interior of fluid supply container 202, one or more air cartridges 226 are provided that attach to an underside of a pressure manifold 228. Preferably, each air cartridge 226 is provided a threaded connection that engages a threaded inlet port on a bottom side of pressure manifold 228. Preferably, each inlet port on the underside of pressure manifold 228 includes a piercer 230 (FIG. 7) that automatically pierces a sealed outlet end of air cartridge 226 when it is fully inserted into and attached to the inlet port. Pressurized air from air cartridge 226 then flows into manifold 228, wherein an integrated free-floating ball check valve 240 is pushed upwards (from the perspective of FIG. 7), wherein air flow is directed towards a center coupler into regulator 232. Note that the opposite, mirror side check valve in the manifold (not shown) prevents leaks since the pressurized air from the air cartridge 226 seats the ball against its chamfer in the opposite ball check valve 240. Manifold 228 directs air from air cartridges 226 into a pressure regulator 232 that adjusts the pressure from air cartridges 226 to a suitable pressure for the interior of fluid supply container 202 to enable delivery of water from fluid supply container 202 to shuttle valve 300. Those skilled in the art will be readily able to designate a suitable pressure for the interior of fluid supply container 202 to fit particular system configurations. Pressure regulator 232 directs air through a regulator outlet line 234 to a valve 236, such as a ball valve that is controlled (i.e., variably moved between fully closed and fully open positions) by manual switch 212 on the outside of cap 206. When valve 236 is moved toward the open position, pressurized air from pressure regulator 232 exits from valve 236 through pressurization system outlet 238 and into the interior of fluid supply container 202, thus pressurizing the water in fluid supply container 202 and driving it through hose 222 to outlet 208 and onward to shuttle valve 300.

Preferably, a manually operable pressure relief valve 342 of standard configuration is provided in cap 206 to enable release of pressure inside of fluid supply container 202. Thus, when fluid supply container 202 is to be refilled with potable water, a user may relieve all pressure from inside of fluid supply container 202 via pressure relief valve 342 to ensure safe opening of the fluid supply container 202. Still further and as best viewed in FIG. 3, a pressurization system cover 250 may be provided over at least a portion of pressurization system 200 to prevent components of pressurization system 200 (i.e., air cartridges 226, pressure manifold 228, and pressure regulator 232) from coming into contact with water that is to be dispensed from fluid supply container 202. This will prevent any undesirable chemicals on those components potentially contaminating the supply of water inside of fluid supply container 202. In certain exemplary configurations, pressurization system cover 250 may comprise a flexible bag that may be secured to manifold 228 over air cartridges 226, manifold 228, and optionally at least a portion of regulator 232.

Next, and with reference to FIGS. 8-11, shuttle valve 300 includes an inlet end 302, outlet end 304, and an intermediate port 306 positioned between the inlet end 302 and outlet end 304. Preferably, a protective cover 308 may be tethered to the body of shuttle valve 300 and configured to cover the inlet end 302 of shuttle valve 300 when shuttle valve 300 is not connected to fluid supply line 204. In an exemplary configuration, a bayonet-type connector may comprise a groove 310 on protective cover 308 and pins 312 on the body of shuttle valve 300 enabling a quick, twist attachment and detachment of protective cover 308 from the inlet end 302 of shuttle valve 300.

Figure 10:
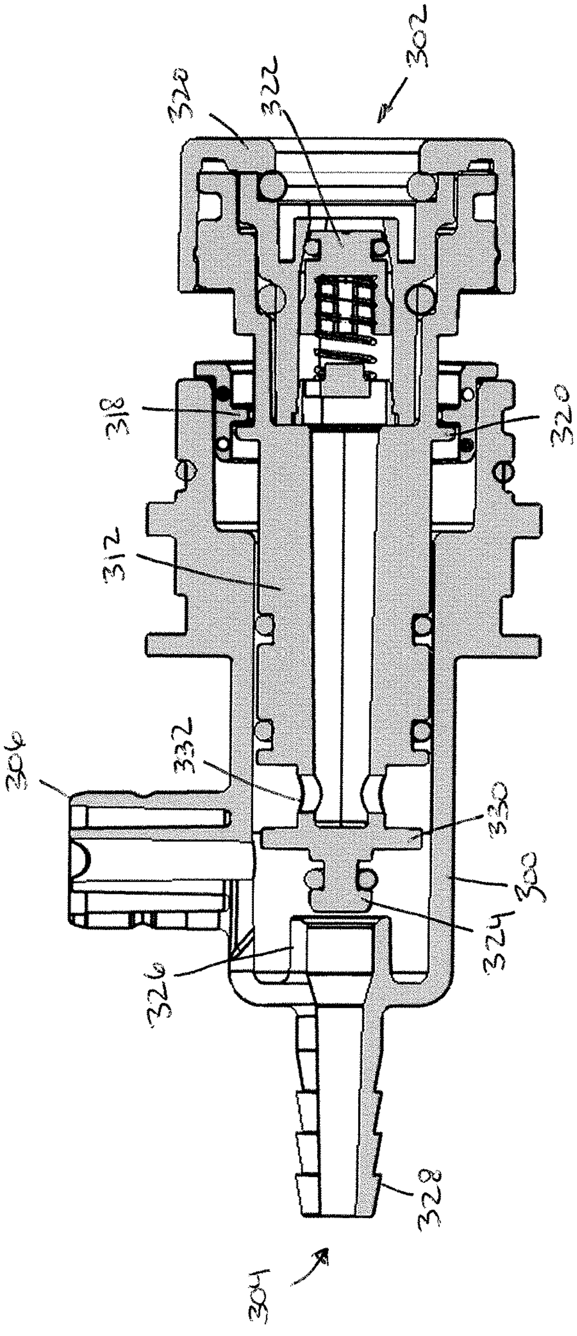
FIG. 10 is a cross-sectional view of the shuttle valve of FIGS. 8 and 9 in a first position enabling an operator to drink from a personal hydration carrier.
Figure 11:
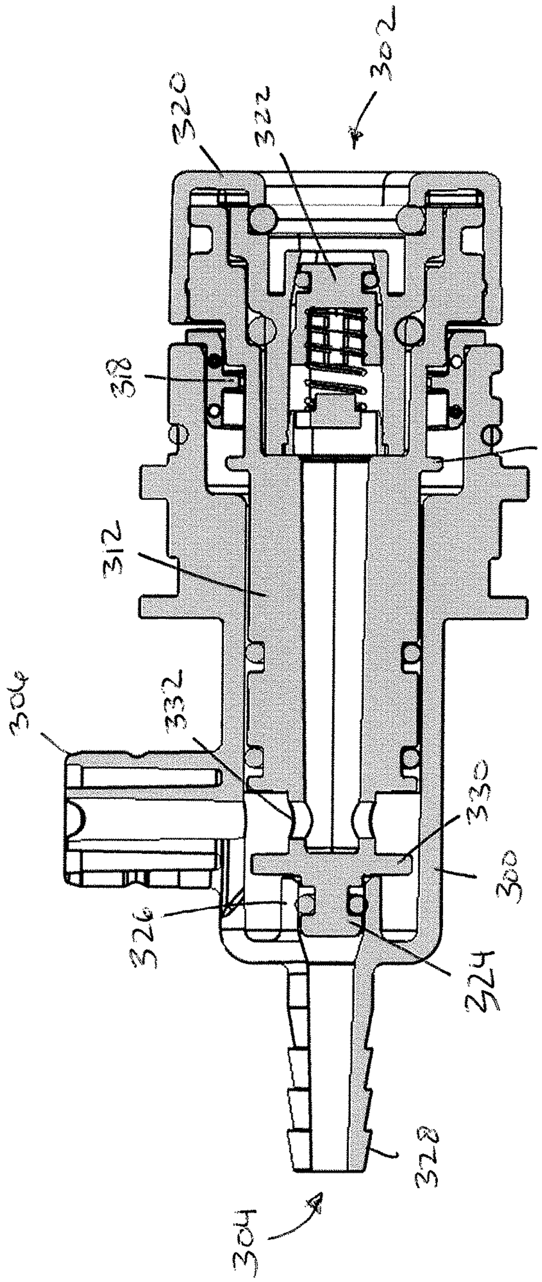
FIG. 11 is a cross-sectional view of the shuttle valve of FIGS. 8 and 9 in a second position enabling an operator to fill a personal hydration carrier.

As shown in the cross-sectional views of FIGS. 10 and 11, inlet end 302 of shuttle valve 300 includes a fluid supply line receiver 310 that is joined to the proximal end of an internal piston 312. An inlet end piston retainer ring 314 is positioned within an open inlet end of a shuttle valve body portion 316 having an internally directed circular flange 318 that abuts an outwardly directly circular flange 320 on the outside of internal piston 312 to prevent removal of piston 312 from the inlet end 302 of shuttle valve 300. Fluid supply line receiver 320 also holds an inlet check valve 322 having a spring-biased piston that opens when fluid supply line male connector 210 is joined to inlet end 302 of shuttle valve 300, thus allowing water to flow into the interior of piston 312 for filling of the operator's personal hydration carrier 500, as discussed below. When fluid supply line male connector 210 is removed, inlet check valve 322 automatically closes to ensure that water does not leak out of the inlet end 302 of shuttle valve 300.

The distal end of piston 312 includes a head 324 that closely mates within the interior of an outlet channel 326, which outlet channel extends into a hose barb 328 at the outlet end 304 of shuttle valve 300 for connection to mask supply hose 402. A distal piston flange 330 is configured to seat against an internal side of outlet channel 326 to seal outlet end 304 when water is to be supplied to intermediate port 306 (for filling of the operator's personal hydration carrier 500). Inward from the distal piston flange 330, a piston port 332 fluidly communicates the interior of piston 312 with the interior of shuttle valve body portion 316. Thus, when shuttle valve 300 is in the position shown in FIG. 10 (i.e., the "drinking" position), a fluid channel extends from the intermediate port 306 to the outlet end 304 of shuttle valve 300, thus enabling the operator to drink water from their personal hydration carrier 500. Likewise, when shuttle valve 300 is in the position shown in FIG. 11 (i.e., the "filling" position) head 324 seals outlet end 304 of shuttle valve 300 while a fluid channel extends between the interior of piston 312 and intermediate port 306. When fluid supply line male connector 210 is engaged with fluid supply line receiver 320, inlet check valve 322 is opened, allowing water from fluid supply line 204 to flow through piston 312, out of piston port 332, through intermediate port 306 and into personal hydration carrier fluid line 502 to refill the operator's personal hydration carrier 500.

Fluid supply line receiver 320 may preferably be manually moved outward with respect to shuttle valve body portion 316 by a user to open shuttle valve 300 for drinking (as shown in FIG. 10), and likewise may be manually pushed inward with respect to shuttle valve body portion 316 to close shuttle valve 300 from supplying water to mask supply line 402 (as shown in FIG. 11). Preferably, fluid supply line male connector 210 is configured to closely mate with fluid supply line receiver 320, such that when fluid supply line male connector 210 is pushed into fluid supply line receiver 320, piston 312 moves to the closed/fill position of FIG. 11, and such that when fluid supply line male connector 210 is pulled out of supply line receiver 320, piston 312 moves to the open/drink position of FIG. 10, although an operator may readily push or hold fluid supply line receiver 320 in the opposite direction (i.e., towards shuttle valve body portion 316) if they don't intend to drink at that moment.

Figure 13:
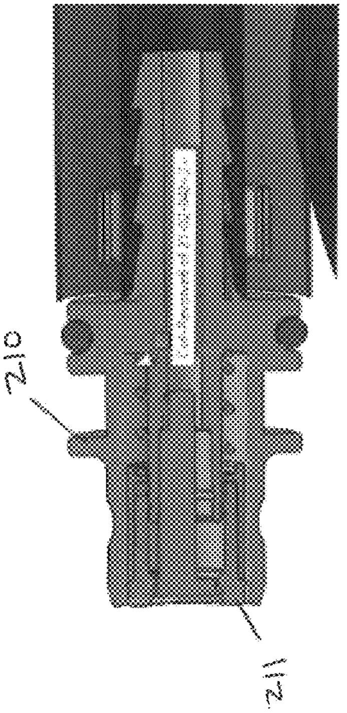
Figure 12:
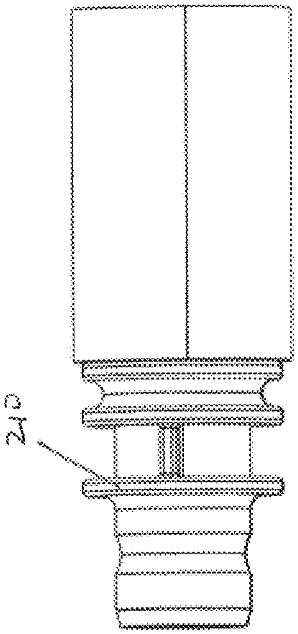
FIG. 12 is a side view and FIG. 13 a cross-sectional view of a fluid supply line connector for use with the hydration system of FIG. 1.

FIGS. 12 and 13 show side and cross-sectional views, respectively, of fluid supply line male connector 210 having a contoured head that closely matches the internal configuration of fluid supply line receiver 320. As explained above, fluid supply line male connector 210 may be configured to attach to a CAMELBAK® type A mask adapter, and thus may optionally have generally the same configuration as standard mask male hydration port 406 discussed herein, and may include a check valve 211 that opens when engaged with inlet check valve 322.

Figure 14:
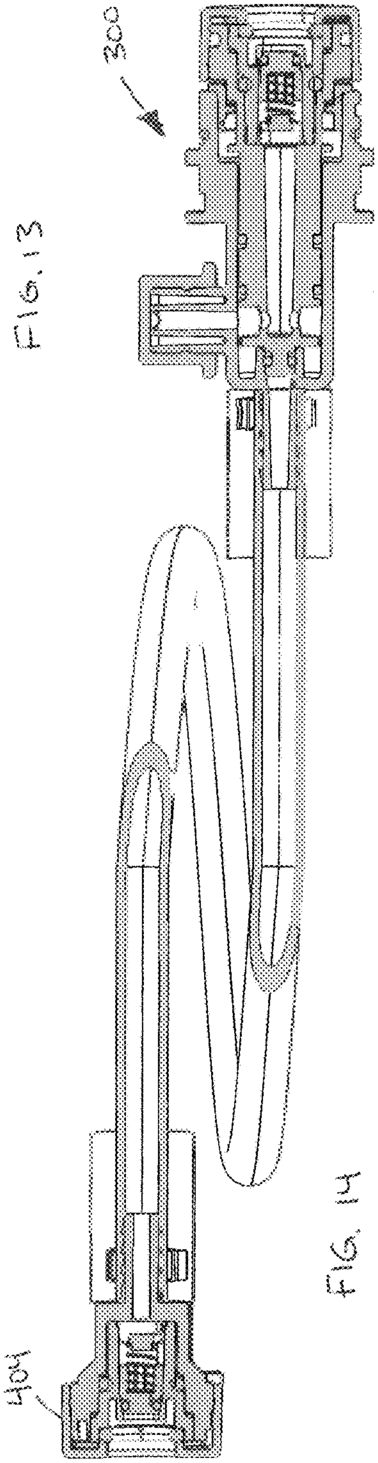
FIG. 14 is a side cross-sectional view of the shuttle valve of FIGS. 8 and 9 with an attached mask supply line and mask supply line female port.
Figure 15:
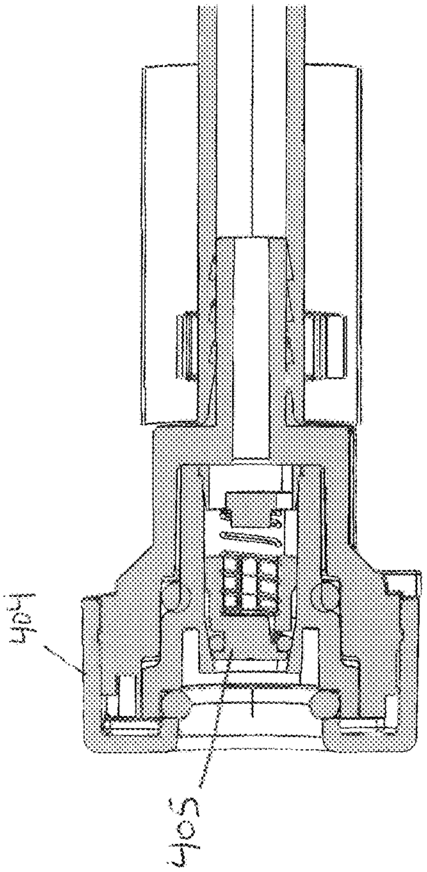
FIG. 15 is a close-up side cross-sectional view of the mask supply line female port of FIG. 14.
Figure 16:
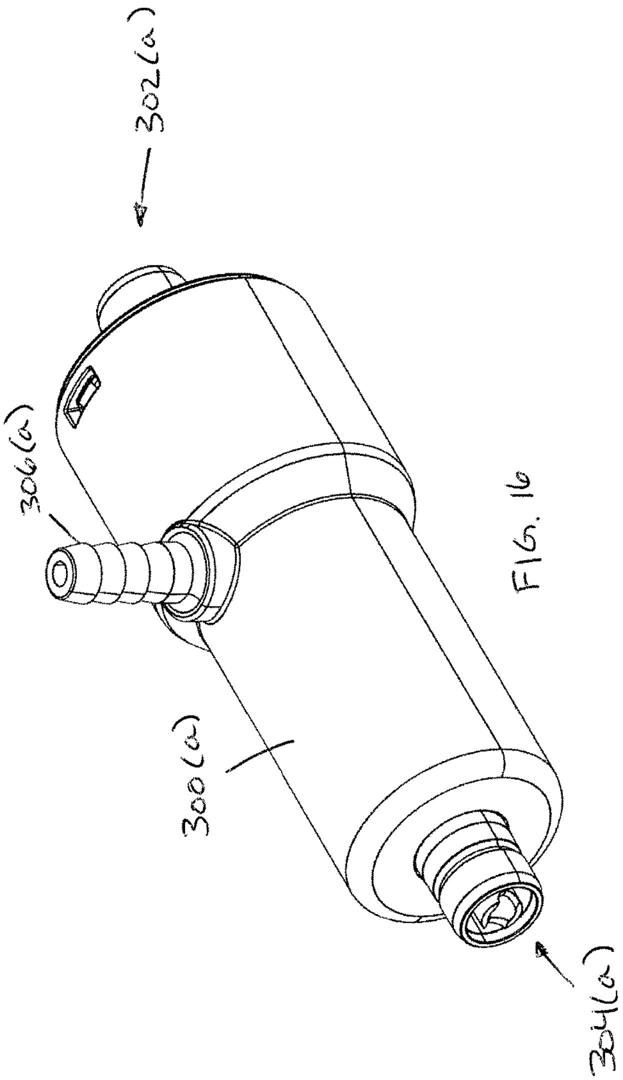
FIG. 16 is a perspective view and FIG. 17 a side view of a shuttle valve for use with the hydration system of FIG. 1 according to further aspects of an embodiment of the invention.
Figure 17:
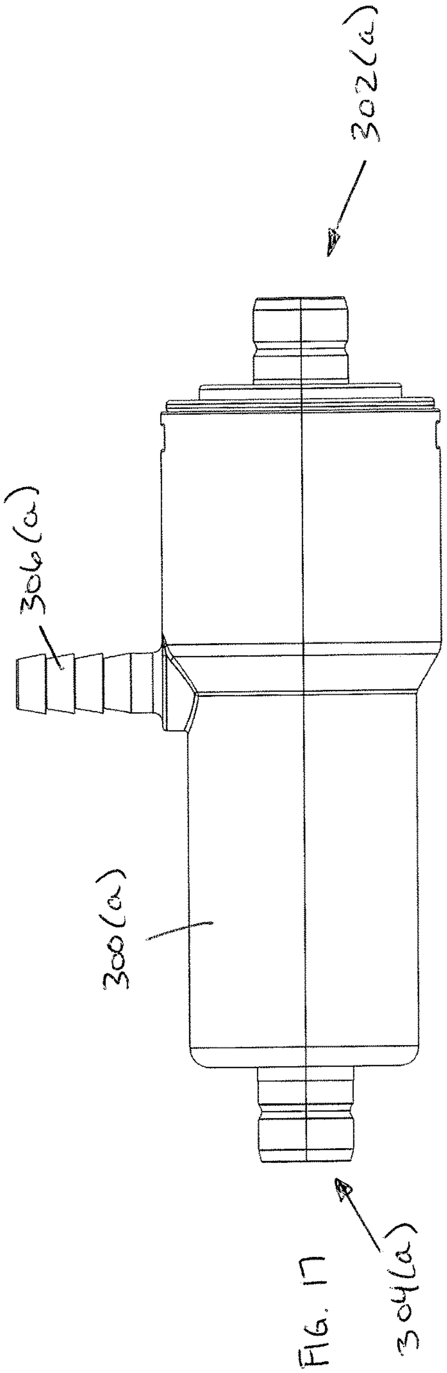

FIG. 14 likewise shows a side, cross-sectional view of shuttle valve 300 and mask supply line female port 404 with mask supply line 402 extending between them, and FIG. 15 shows a close-up cross-sectional view of mask supply line female port 404. Again as explained above, mask supply line female port 404 may have generally the same configuration as a CAM ELBAK® type A mask adapter, and once again may include a check valve 405 that opens when engaged with a standard mask male hydration port 406.

Figure 18:
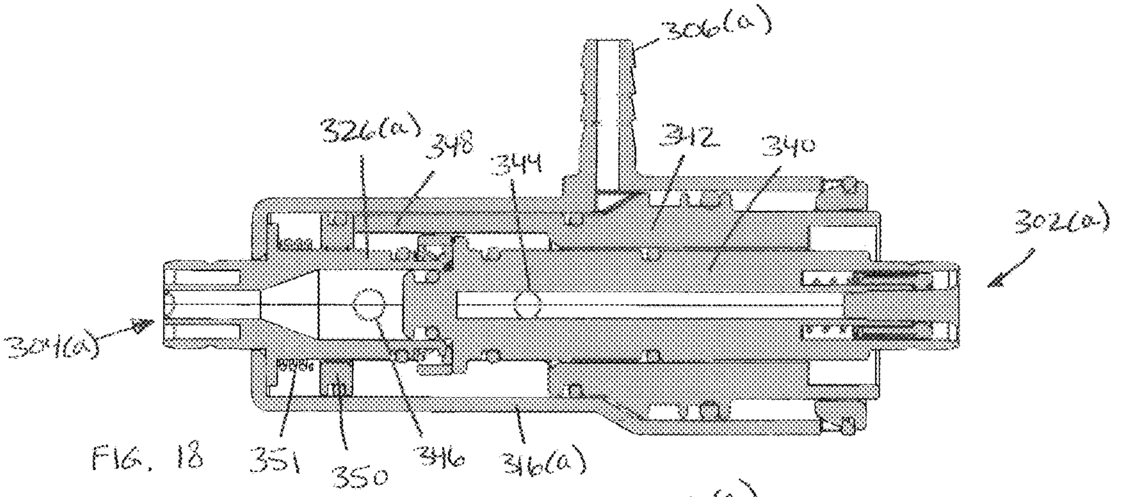
FIG. 18 is a side cross-sectional view of the shuttle valve of FIGS. 16 and 17 in a first position enabling an operator to fill a personal hydration carrier.
Figure 19:
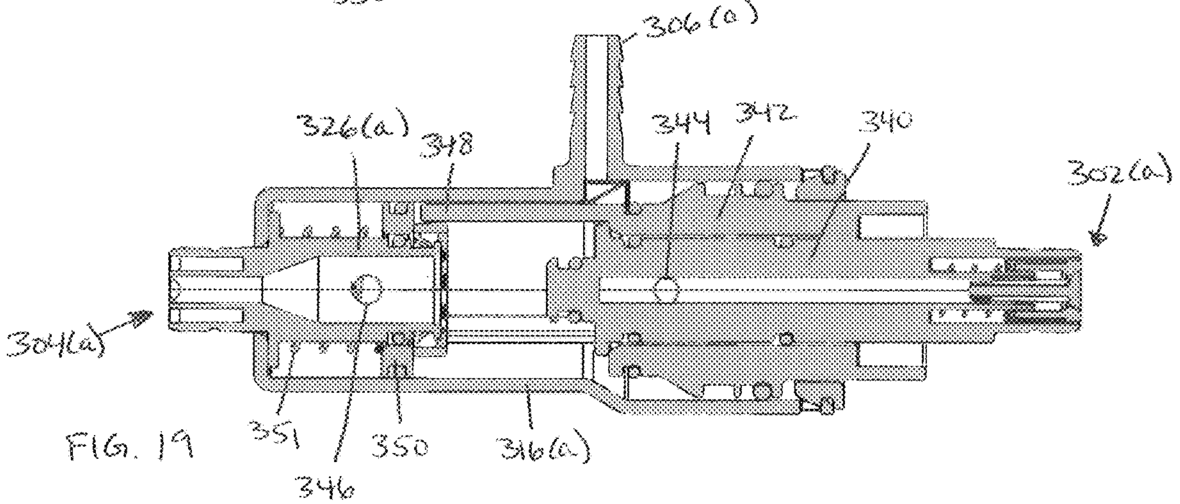
FIG. 19 is a side cross-sectional view of the shuttle valve of FIGS. 16 and 17 in a second position enabling an operator to drink from a personal hydration carrier.
Figure 20:
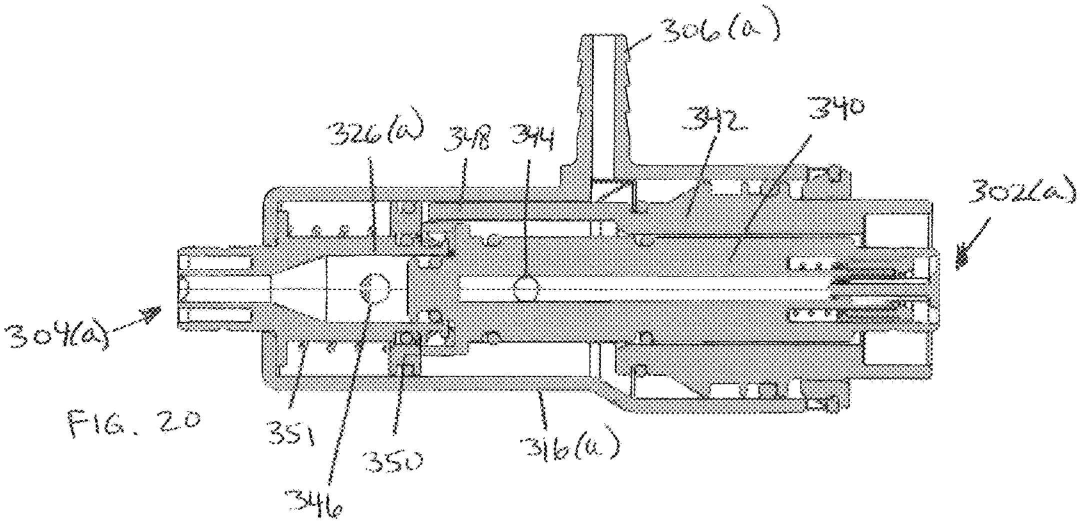
FIG. 20 is a side cross-sectional view of the shuttle valve of FIGS. 16 and 17 in a third position enabling an operator to draw nutrient from a nutrient pouch (not shown) attached to an inlet end of the shuttle valve.

Next, in a further configuration according to aspects of the invention, and as shown in FIGS. 16-20, a shuttle valve 300(*a*) may alternatively be configured to selectively (i) direct water from pressurized fluid container 202 to personal hydration carrier 500 (FIG. 18), (ii) direct water from personal hydration carrier 500 to the operator's mask 400 (FIG. 19), and (iii) direct flowable food or other nutrient from a nutrient pouch (which may be connected to shuttle valve 300 when the fluid supply line 204 from pressurized fluid supply container 202 has been removed from shuttle valve 300(*a*)) to the operator's safety mask 400 via mask supply line 402 (FIG. 20). Shuttle valve 300(*a*) includes a first piston 340 and a second piston 342. Piston 342 is configured to slide within shuttle valve body portion 316(*a*), while first piston 340 is configured to slide within second piston 342. First piston 340 has a first piston port 344 that provides fluid communication between the interior of piston 340 and the interior of shuttle valve body portion 316(*a*). Outlet channel 326(*a*) likewise has an outlet channel port 346 that provides fluid communication between the interior of outlet channel 326(*a*) and the interior of shuttle valve body portion 316(*a*). Second piston 342 has a second piston extension arm 348 extending from a distal end of second piston 342, which piston extension arm 348 engages a slider plate 350 that slides along the outside of outlet channel 326(*a*).

In this configuration and with particular reference first to FIG. 18, when a connector from fluid supply line 204 (not shown in FIG. 18 for clarity, but in this configuration having the same form as mask supply line female port 404 shown in FIG. 15) is connected to the inlet end 302(*a*) of shuttle valve 300(*a*), second piston 342 is pushed into shuttle valve body portion 316(*a*) to close intermediate port 306(*a*), such that water flows from inlet end 302(*a*) through first piston 340, out of first piston port 344, into outlet channel port 346, and out from outlet end 304(*a*) to supply water to the operator's personal hydration carrier 500, which in this configuration is in fluid communication with the outlet end of shuttle valve 300.

Likewise and with particular reference to FIG. 19, when no connector is connected to the inlet end 302(*a*) of shuttle valve 300(*a*), slider plate 350 is positioned (under the bias of spring 351) at an interior end of outlet channel 326(*a*), pushing second piston 342 (via second piston extension arm 348) towards inlet end 302(*a*) of shuttle valve 300(*a*) and opening intermediate port 306(*a*). Further, the inlet end 302(*a*) of shuttle valve 300(*a*) is sealed, as first piston port 344 is positioned within the body of second piston 342 and blocked from supplying fluid to either outlet end 304(*a*) or intermediate port 306(*a*). Thus, with both outlet end 304(*a*) of shuttle valve 300(*a*) and intermediate port 306(*a*) open, water is supplied from the operator's personal hydration carrier 500 through the outlet end 304(*a*) to the intermediate port 306(*a*) to direct water to the user's protective mask 400.

Figure 21:
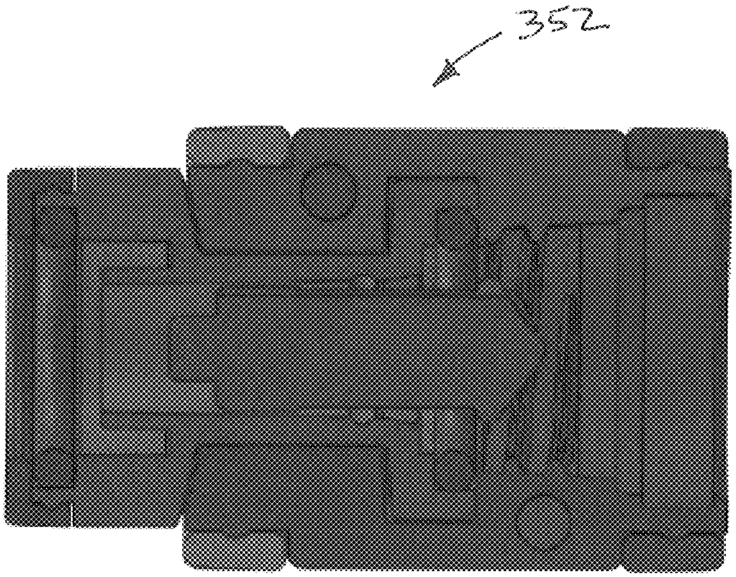
FIG. 21 is a side cross-sectional view of a connector for a nutrient pouch for use with the shuttle valve in the position shown in FIG. 20.

Finally and with particular reference to FIG. 20, when the connector 352 from an external nutrient pouch (having a different configuration than the connector from fluid supply line 204, and particularly having the configuration shown in FIG. 21) is connected to the inlet end 302(*a*) of shuttle valve 300(*a*), slider plate 350 again is positioned (under the bias of spring 351) at an interior end of outlet channel 326(*a*) and particularly past outlet channel port 346, and the head 324(*a*) of first piston 340 sits within outlet channel 326(*a*), thus fully sealing off outlet end 304(*a*) of shuttle valve 300(*a*). As it moves, slider plate 350 also pushes second piston extension arm 348 toward the inlet end 302(*a*) of shuttle valve 300(*a*), in turn pushing second piston 342 away from intermediate port 306(*a*). Thus, with both inlet end 302(*a*) of shuttle valve 300(*a*) and intermediate port 306(*a*) open, liquid nutrient may then flow from the inlet end 302(*a*) of shuttle valve 300(*a*) to the intermediate port 306(*a*) of shuttle valve 300(*a*) to supply fluid nutrient from an attached nutrient pouch to the user's protective mask 400. A nutrient pouch connector 352 has been further described in U.S. patent application Ser. No. 17/319,490, the specification of which is incorporated herein by reference in its entirety.

A hydration system configured in accordance with at least certain aspects of the foregoing will enable filling of a user's personal hydration carrier and drinking of water or other hydrating fluid from the water carrier without exposing the hydrating fluid to a potentially harmful environment, such as a CBRN environment, all while allowing the operator to keep their mask fluidly connected to their hydration system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A hydration system, comprising:

a pressurization system attached to a cap configured for removable attachment to a fluid container, the cap having a top side and a bottom side, wherein the bottom side of the cap is configured for sealing engagement against an inlet/outlet opening of the fluid container, the pressurization system further comprising:

a pressure manifold having at least one manifold inlet on a bottom side of the pressure manifold;

an air cartridge removably attached to said at least one manifold inlet;

a pressure regulator affixed to the manifold and attached to the bottom side of the cap, said pressure regulator having an outlet;

a valve on the bottom side of the cap, said valve having a valve inlet in fluid communication with said outlet on said pressure regulator, and a valve outlet opening to a space below the bottom side of the cap;

a fluid outlet extending through the cap; and a hose attached to the fluid outlet at the bottom side of the cap; and a shuttle valve in fluid communication with said fluid outlet.

2. The hydration system of claim 1, further comprising a manually operable switch on the top side of the cap configured to variably open and close said valve on the bottom side of the cap.

3. The hydration system of claim 1, further comprising at least one fluid supply line connector on the fluid outlet at the top side of the cap.

4. The hydration system of claim 3, further comprising a plurality for fluid supply line connectors on the fluid outlet at the top side of the cap.

5. The hydration system of claim 1, said hose having a first end and a second end defining a hose inlet, wherein the first end of said hose is attached to said fluid outlet on the bottom side of said cap, and a fluid strainer is attached to the second end of said hose.

6. The hydration system of claim 1, further comprising a pressure relief valve extending through said cap.

7. The hydration system of claim 6, said pressure relief valve further comprising a pressure relief valve actuator on the top side of said cap.

8. The hydration system of claim 1, further comprising a removable cover extending over at least said manifold and said air cartridge.

9. The hydration system of claim 1, said shuttle valve having a shuttle valve body having a first end and a second end opposite said first end, said shuttle valve further comprising:

a fluid supply line receiver at said first end of said shuttle valve body;

a first fluid port at said second end of said shuttle valve body;

an intermediate port between said first end of said shuttle valve body and said second end of said shuttle valve body; and a piston moveable in said shuttle valve body from a first position sealing said fluid supply line receiver at said first end of said shuttle valve body and enabling fluid communication between said first fluid port at said second end of said shuttle valve body and said intermediate fluid port, to a second position sealing said first fluid port at said second end of said shuttle valve body and enabling fluid communication between said fluid supply line receiver at said first end of said shuttle valve body and said intermediate port.

10. The hydration system of claim 9, further comprising:

a protective mask in fluid communication with one of said first fluid port at said second end of said shuttle valve body and said intermediate port; and a personal hydration carrier in fluid communication with the other of said first fluid port at said second end of said shuttle valve body and said intermediate port.

11. The hydration system of claim 9, wherein said piston is affixed to and moveable with said fluid supply line receiver.

12. The hydration system of claim 11, further comprising an inlet check valve in said fluid supply line receiver.

13. The hydration system of claim 12, wherein said inlet check valve is configured to open in response to connection of a fluid supply line connector into said fluid supply line receiver.

14. The hydration system of claim 13, wherein said fluid supply line receiver is moveable in response to insertion and removal of said fluid supply line connector.

15. The hydration system of claim 9, wherein said piston is further moveable in said valve to a third position sealing said intermediate port and enabling fluid communication between said first end of said shuttle valve body and said first fluid port at said second end of said shuttle valve body.

16. The hydration system of claim 15, wherein said piston further comprises a first piston section moveable in said shuttle valve body and a second piston section moveable in said first piston section.

17. A hydration system, comprising:

a fluid supply container having a cap and a pressurization system on an underside of said cap, the pressurization system having a removable source of compressed air and a valve in fluid communication with said source of compressed air, wherein said valve is configured to selectively direct said compressed air to an interior of said fluid supply container to pressurize fluid in said container;

a fluid outlet extending through the cap and configured to direct pressurized hydrating fluid in said fluid supply container through said fluid outlet to a fluid supply line; and a shuttle valve configured for fluid communication with said fluid supply line, said shuttle valve having a first end and a second end opposite said first end, said shuttle valve further comprising:

a fluid supply line receiver at said first end of said shuttle valve body configured to engage said fluid supply line;

a first fluid port at said second end of said shuttle valve body;

an intermediate port between said first end of said shuttle valve body and said second end of said shuttle valve body; and a piston moveable in said shuttle valve body from a first position sealing said fluid supply line receiver at said first end of said shuttle valve body and enabling fluid communication between said first fluid port at said second end of said shuttle valve body and said intermediate fluid port, to a second position sealing said first fluid port at said second end of said shuttle valve body and enabling fluid communication between said fluid supply line receiver at said first end of said shuttle valve body and said intermediate port.

18. The hydration system of claim 17, further comprising:

a protective mask in fluid communication with one of said first fluid port at said second end of said shuttle valve body and said intermediate port; and a personal hydration carrier in fluid communication with the other of said first fluid port at said second end of said shuttle valve body and said intermediate port.

19. The hydration system of claim 17, wherein said piston is affixed to and moveable with said fluid supply line receiver, and wherein said fluid supply line receiver is moveable in response to insertion and removal of a connector affixed to an end of said fluid supply line.

20. The hydration system of claim 17, wherein said piston is further moveable in said valve to a third position sealing said intermediate port and enabling fluid communication between said first end of said shuttle valve body and said first fluid port at said second end of said shuttle valve body.

* * * * *